Aug. 29, 1961
W. PEREZ
2,997,858
THERMAL COOLING ELEMENT
Original Filed April 9, 1953
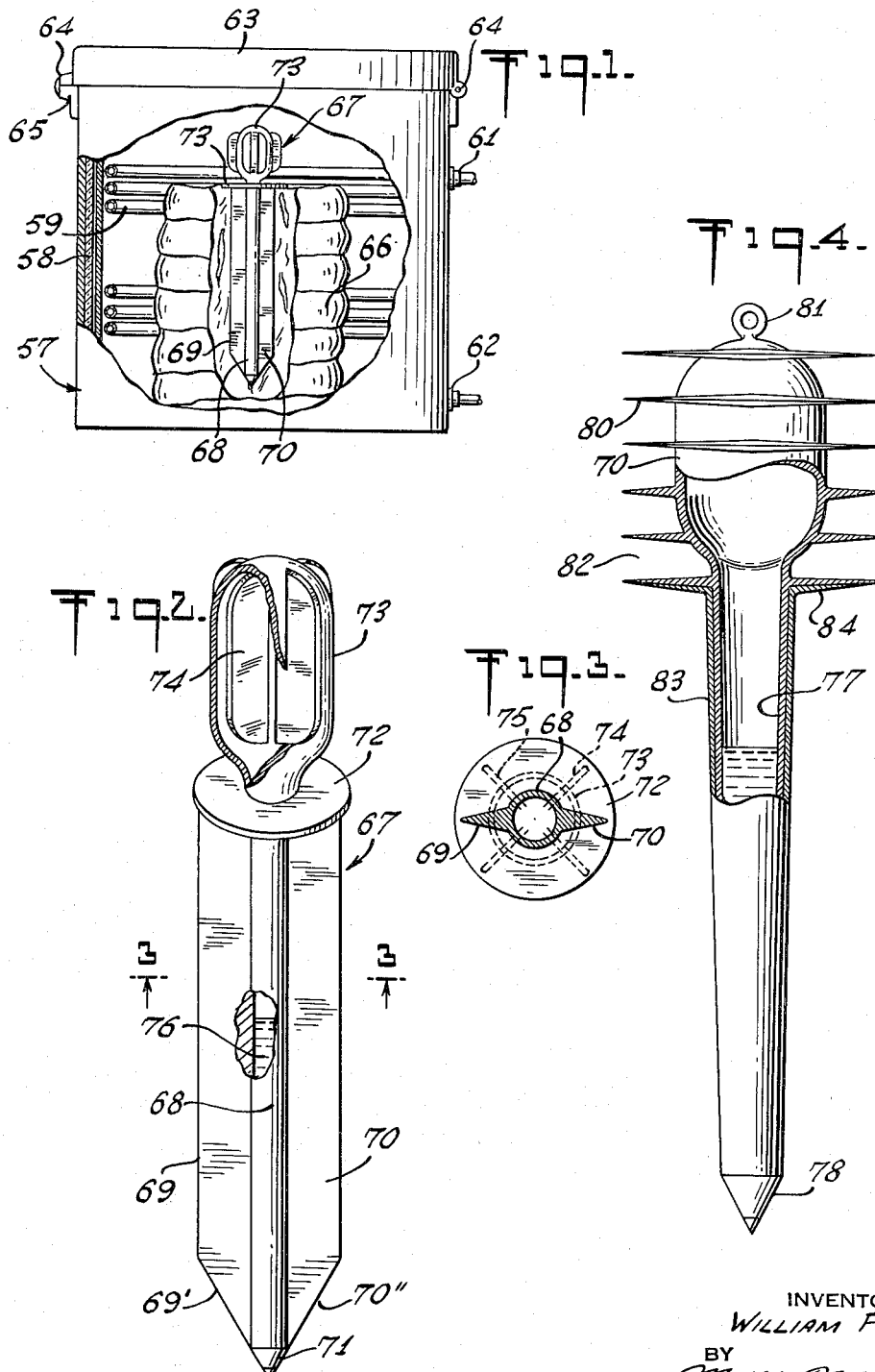
INVENTOR
WILLIAM PEREZ
BY
Moses, Nolte & Nolte
ATTORNEYS

United States Patent Office 2,997,858
Patented Aug. 29, 1961

2,997,858
THERMAL COOLING ELEMENT
William Perez, 153 Meadowsweet Road, Mineola, N.Y.
Original application Apr. 9, 1953, Ser. No. 351,285, now Patent No. 2,835,480, dated May 20, 1958. Divided and this application Jan. 21, 1958, Ser. No. 710,309
2 Claims. (Cl. 62—293)

This invention relates to thermal devices and more particularly to cooling apparatus including thermal pins or elements for cooling or refrigerating material which may be a solid or liquid mass.

The present invention is a division of my co-pending patent application Serial No. 351,285, filed April 9, 1953, now Patent No. 2,835,480.

It is an object of the present invention to provide novel refrigerating means for cooling a mass by employing means which may be or may include thermal pins.

A further object of the invention is to provide novel thermal pins having means to facilitate and expedite cooling of a mass by insertion of the pin means therewithin.

A further object of the invention is to provide a cooling system employing a container having cooling means therein usable with the novel thermal pin means of the invention.

Other and further objects of the invention will be apparent from a perusal of the following detailed description taken in connection with the accompanying drawings, in which:

FIG. 1 is an elevational view of a cooling vessel having been adapted to quick freeze a piece of meat, the piece of meat being shown within the vessel or container and with a novel thermal pin or element containing a liquid refrigerant thrust into the roast from the top thereof;

FIG. 2 is a perspective view of the thermal pin used to facilitate the quick freezing of meat as shown in FIG. 1 and with portions of the thermal pin being broken away at different elevations thereof to show the interior construction and the elevation of the liquid refrigerant therein;

FIG. 3 is a transverse sectional view taken on line 2—2 of FIG. 2;

FIG. 4 is an elevational view of a modified form of a thermal pin containing a liquid refrigerant and which is tapered and coated with a special substance to facilitate the removal of the pin from a frozen mass.

Referring to the drawings, there is shown in FIG. 1 a cooling vessel 57 that is insulated as indicated at 58 and which has internal cooling coils 59 through which cooling brine is passed. Inlet and outlet fittings 61 and 62 are provided on the side of the vessel by which the cooling brine can be delivered to the cooling coils and removed therefrom. The cooling vessel 57 is closed by a hinged cover 63 hinged to one side of the vessel as indicated at 64 and having a handle latch element 64' engageable with a latch 65 on the upper edge of the cooling vessel 57. Into this vessel 57 is placed a mass such as a rolled roast 66 for the purpose of being quickly frozen. To facilitate the freezing of the interior of this roast there has been provided a special thermal pin 67 containing a liquid refrigerant. Details of this pin 67 are shown in FIGS. 2 and 3 and comprises a central tube portion 68 having two diametrically opposite radially extending fins 69 and 70 integrally formed thereon to provide a rigid and reinforced tube 68 that can withstand the thrust of the pin into the meat mass. The forward end of the pin has a tapered end which may include a valve plug arrangement 71 for evacuating the gases, and may be conventional in design such as a screw threaded into a hole communicating with the interior of the tube to seal the tube and thereafter have the tapered end heat brazed thereon. The radial portions 69 and 70 are tapered as indicated at 69' and 70' respectively to conform to the taper of the valve plug 71.

Above the radial reinforcing portions 69 and 70 are stop flange 72 to limit the inward thrust of the pin into the meat body.

The upper end of the tube 68 is enlarged and closed and is of bulbous configuration as indicated at 73.

The enlargement 73 has a plurality of radially extending heat dissipating fins 74 that extend inwardly beyond the inner surface of the enlargement 73 as indicated at 75. Within the tube 68 is a liquid refrigerant 76, such as ammonia or sulfur-dioxide that will readily evaporate by heat passing through the walls of the tube 68 and which will expand into the enlargement 73 where it will be cooled or condensed by the cold air within the cooling vessel 57 and created by the cooling coil 59. The interior of the roast 66 will thus be quickly cooled and upon the roast 66 being removed from the cooling vessel 57 the pin 67 can be removed therefrom before placing the roast in the regular freezer.

In FIG. 4 there is shown a modified form of a refrigerating pin which may be used in the same manner as the pin 67 has been used in the roast 66. This refrigerating pin comprises a slightly tapered tube portion 77 having a tapered valve head 78 by which the tube can be closed in the manner discussed with reference to the valve plug of FIG. 2. The upper end of the tube 77 is enlarged to provide an expansion chamber into which the refrigerant may expand. This enlargement is indicated at 79 and has a plurality of vertically spaced cooling fins 80 and a top loop 81 by which a hook or cable can be attached for the purpose of extracting the pin from the frozen mass. The stop flange 82 which is also a cooling fin, is provided below the enlargement or bulbous portion 79 so as to limit the inward thrust of the pin into the meat mass. To further facilitate the removal of the refrigerating pin from the frozen mass, a coating 83 of tetrafluoroethylene or the like is provided on the tapered tube 77 throughout its length thereof and upon the underside of the stop flange 82 as indicated at 84.

It will thus be seen that a rugged pin has been provided and one which will stand the thrust of its tapered tube portion into the meat mass and as well one which can be easily and readily severed from the meat mass after it has been frozen.

In all of these thermal pins, substantially all air and other gases will have been evacuated from the tube and there remains only the liquid and its vapors within the tube. When the tube absorbs heat at its lower end, the liquid is evaporated so that its vapors rise and the latent heat of these vapors is transmitted to the walls of the tube and taken away by the mass or medium surrounding the upper end of the tube thereby causing the coolant to lower the temperature of the mass in which the device has been inserted.

From the foregoing it will be seen that novel pins are provided to facilitate and expedite cooling of a mass by insertion of the pin means within said mass. Further, a container has been provided with cooling coils therein and a closure member for maintaining the cooled air within the container, whereby the cooled air cools the fins of the thermal pin which is used for insertion within the mass to be cooled or refrigerated. The thermal pins and the cooling container are usable as a cooling unit. The radiating fins on the thermal pins may be of the type set forth in either FIGS. 2 and 3 or FIG. 4.

It is to be understood that said certain changes may be made in the invention without departing from the spirit and scope of the present invention, as defined by the appended claims.

What is claimed as new and desired to be secured by Letters Patent of the United States is:

1. A thermal device for lowering the temperature of a mass, such as meat, to be cooled by insertion of the device into the mass, said thermal device including a tubular portion of substantially uniform dimension and of durable material and pointed at one end to afford insertion of said tubular portion into a mass to be cooled, said tubular portion being partially evacuated of gases and containing a liquid coolant to be vaporized, said tubular portion further including vertically elongated outstanding fins pointed at the lower end to permit insertion of said tubular portion into a mass, and a condensing portion communicating with said liquid containing tubular portion at the opposite end thereof for location outside the mass being cooled to receive and condense the vapors of the liquid from said tubular portion.

2. A thermal device for lowering the temperature of a mass to be cooled as set forth in claim 1, where the device has valve means usable for evacuation of gases therefrom, and means covering the exterior areas of said valve means and providing a sharply tapered end to facilitate insertion of the device into a mass.

References Cited in the file of this patent
UNITED STATES PATENTS

| | | |
|---|---|---|
| 1,780,267 | Malone | Nov. 4, 1930 |
| 1,875,293 | Schlumbohm | Aug. 30, 1932 |
| 2,258,173 | Bratek | Oct. 7, 1941 |
| 2,263,241 | Harvey | Nov. 18, 1941 |
| 2,499,736 | Kleen | Mar. 7, 1950 |
| 2,575,141 | Smith | Nov. 13, 1951 |
| 2,591,375 | Radford | Apr. 1, 1952 |
| 2,672,032 | Towse | Mar. 16, 1954 |
| 2,835,480 | Perez | May 20, 1958 |